United States Patent
Lu (10) Patent No.: US 9,944,205 B2
(45) Date of Patent: Apr. 17, 2018

(54) CUSHION AND METHOD OF USE (71) Applicant: Chia-Ao William Lu, Taipei (TW)

(72) Inventor: Chia-Ao William Lu, Taipei (TW)

( * ) Notice: Subject to any disclaimer, the term of this patent is extended or adjusted under 35 U.S.C. 154(b) by 0 days.

(21) Appl. No.: 15/610,256

(22) Filed: May 31, 2017

(65) Prior Publication Data

US 2017/0267132 A1 Sep. 21, 2017

Related U.S. Application Data (63) Continuation of application No. 14/309,094, filed on Jun. 19, 2014.

(60) Provisional application No. 61/836,851, filed on Jun. 19, 2013.

(51) Int. Cl.
| | |
|---|---|
| *B60N 2/32* | (2006.01) |
| *B60N 2/34* | (2006.01) |
| *A47C 17/80* | (2006.01) |
| *A47C 27/08* | (2006.01) |
| *B60N 2/30* | (2006.01) |
| *B60N 2/44* | (2006.01) |
| *B64D 11/06* | (2006.01) |

(52) U.S. Cl.
CPC ......... *B60N 2/3097* (2013.01); *B60N 2/4415* (2013.01); *B64D 11/0643* (2014.12); *B64D 11/0646* (2014.12)

(58) Field of Classification Search
CPC ......... A47C 17/64; A47C 17/80; A47C 27/00; A47C 27/08; A47C 27/081; B60N 2/34; B60N 2/32
See application file for complete search history.

(56) References Cited

U.S. PATENT DOCUMENTS

| | | | | |
|---|---|---|---|---|
| 691,118 | A | 1/1902 | Curlin | |
| 2,163,198 | A * | 6/1939 | Gossard | B61D 33/005 |
| | | | | 297/245 |
| 2,493,170 | A * | 1/1950 | Stiff | B60N 3/001 |
| | | | | 108/19 |
| 2,503,602 | A * | 4/1950 | Titley | B60N 2/345 |
| | | | | 108/134 |
| 2,648,072 | A * | 8/1953 | De Blieux | B60N 2/345 |
| | | | | 296/63 |
| 2,650,374 | A * | 9/1953 | Pierce | B60N 2/2854 |
| | | | | 108/171 |
| 2,676,337 | A * | 4/1954 | Soeder | B60N 2/2854 |
| | | | | 5/655 |
| 2,696,246 | A * | 12/1954 | Putnam | B60N 2/2854 |
| | | | | 108/129 |
| 2,796,111 | A * | 6/1957 | Janczyszyn | B60N 2/34 |
| | | | | 297/112 |
| 2,919,747 | A * | 1/1960 | Post | A47C 27/081 |
| | | | | 156/227 |
| 3,029,109 | A * | 4/1962 | Nail | A47C 4/54 |
| | | | | 297/461 |

(Continued)

*Primary Examiner* — Robert G Santos
*Assistant Examiner* — Ifeolu Adeboyejo
(74) *Attorney, Agent, or Firm* — Levine Bagade Han LLP (57) ABSTRACT

A cushion for inserting in the legwell between individual seats in rows of seats, for example in a vehicle, is disclosed. The top of the cushion can act as a surface for a user to lie down. The cushion can be inflatable and can be deflated for easy transport. The cushion can have multiple reservoirs so the internal pressure can be separately adjusted for the base and for the mattress of the cushion, similar to a box spring and a mattress in a common bed.

19 Claims, 4 Drawing Sheets

(56) References Cited

U.S. PATENT DOCUMENTS

| | | | |
|---|---|---|---|
| 3,066,725 A | 12/1962 | Schweitzer | |
| 3,097,876 A * | 7/1963 | Willson | B60P 3/36 |
| | | | 296/156 |
| 3,143,746 A * | 8/1964 | Spear | A47C 17/80 |
| | | | 5/94 |
| 3,513,489 A * | 5/1970 | Martin | A47D 9/005 |
| | | | 5/710 |
| 3,600,725 A * | 8/1971 | McCartney | A47C 17/80 |
| | | | 108/44 |
| 3,644,949 A | 2/1972 | Diamond | |
| 3,648,306 A * | 3/1972 | Auerbach | A47C 17/80 |
| | | | 280/751 |
| 3,696,449 A * | 10/1972 | Smith | A47C 27/081 |
| | | | 297/DIG. 3 |
| 3,701,576 A * | 10/1972 | Moen | A47B 23/002 |
| | | | 108/43 |
| 4,175,297 A | 11/1979 | Robbins et al. | |
| 4,631,767 A | 12/1986 | Carr et al. | |
| 4,810,037 A | 3/1989 | Takagi | |
| 5,005,702 A * | 4/1991 | Davis | B60N 3/002 |
| | | | 108/43 |
| 5,081,936 A * | 1/1992 | Drieling | B60N 3/002 |
| | | | 108/25 |
| 5,134,930 A * | 8/1992 | Mei-Hwa | A47B 23/00 |
| | | | 100/42 |
| 5,154,649 A * | 10/1992 | Pender | A47D 13/083 |
| | | | 5/490 |
| 5,185,896 A * | 2/1993 | Bonda | A47C 17/80 |
| | | | 5/118 |
| 5,333,336 A * | 8/1994 | Langsam | A47C 3/38 |
| | | | 297/DIG. 3 |
| 5,441,466 A * | 8/1995 | Piaget | A63B 21/0085 |
| | | | 297/423.46 |
| 5,516,194 A * | 5/1996 | Maule | B60N 2/06 |
| | | | 297/115 |
| 5,544,373 A * | 8/1996 | Chang | A47C 17/80 |
| | | | 5/118 |
| 5,645,319 A | 7/1997 | Parks, Jr. | |
| 5,809,597 A * | 9/1998 | Shaw | A47C 20/021 |
| | | | 5/632 |
| D405,291 S * | 2/1999 | Yu | D6/406.5 |
| 6,042,185 A * | 3/2000 | Cowgur | A47C 7/383 |
| | | | 297/393 |
| 6,112,350 A * | 9/2000 | Larson | A47C 21/06 |
| | | | 5/710 |
| 6,131,219 A * | 10/2000 | Roberts | A47G 9/1027 |
| | | | 5/636 |
| 6,328,385 B1 * | 12/2001 | Lau | A47C 4/54 |
| | | | 297/452.41 |
| 6,442,779 B1 * | 9/2002 | LeVert | A47C 4/54 |
| | | | 5/648 |
| 6,647,573 B2 | 11/2003 | Corbin | |
| 6,754,925 B1 * | 6/2004 | Wang | A47C 27/081 |
| | | | 5/706 |
| 6,754,926 B2 * | 6/2004 | Wang | A47C 27/081 |
| | | | 5/655.3 |
| 7,069,609 B2 * | 7/2006 | Zheng | A47C 4/54 |
| | | | 5/644 |
| 7,246,393 B2 * | 7/2007 | Westendorf | A47C 27/081 |
| | | | 5/12.1 |
| 7,269,866 B2 * | 9/2007 | Liu | A47C 27/082 |
| | | | 5/710 |
| 7,300,104 B1 * | 11/2007 | Hagedorn | A47B 83/02 |
| | | | 297/158.3 |
| 7,845,718 B1 * | 12/2010 | Bosstick | B60N 2/345 |
| | | | 297/118 |
| 8,286,285 B2 * | 10/2012 | Mahler | A61F 5/01 |
| | | | 128/878 |
| 8,413,277 B2 * | 4/2013 | Davis | A61G 7/1011 |
| | | | 137/512.1 |
| 8,656,539 B1 * | 2/2014 | Boyd | A47C 27/10 |
| | | | 5/655.3 |
| 8,752,221 B2 * | 6/2014 | Ortega | A47C 20/026 |
| | | | 5/630 |
| 2003/0024448 A1 * | 2/2003 | Lieberman | A47B 37/00 |
| | | | 108/161 |
| 2003/0117005 A1 * | 6/2003 | Becker | A47C 4/54 |
| | | | 297/452.41 |
| 2007/0028388 A1 * | 2/2007 | Fletcher | A61G 7/1021 |
| | | | 5/655.3 |
| 2010/0180382 A1 | 7/2010 | Hunter | |
| 2010/0229298 A1 * | 9/2010 | Davis | A61G 7/0755 |
| | | | 5/81.1 R |
| 2013/0167758 A1 * | 7/2013 | Zhu | A47B 37/04 |
| | | | 108/50.18 |

* cited by examiner

CUSHION AND METHOD OF USE

CROSS-REFERENCE TO RELATED APPLICATION

This application is a continuation of U.S. patent application Ser. No. 14/309,094 filed Jun. 19, 2014, which claims the benefit of U.S. Provisional Application No. 61/836,851 filed Jun. 19, 2013, each of which is herein incorporated by reference in its entirety.

BACKGROUND

1. Technical Field

A cushion for use between seats on a vehicle and a method of using the same is disclosed. For example, the cushion can be positioned in the legwell between a first seat and a second seat in the row immediately in front of the first seat on an airplane and be laid upon by a passenger.

2. Description of Related Art

Airplane, train and car travel over long distances can be physically uncomfortable, especially for younger passengers accustomed to moving around more than allowed on cars and in planes. Sleeping helps pass the travel time for such passengers, but often the seats do not sufficiently recline to make sleep comfortable, the seats are too uncomfortable (e.g., hard or rough), dirty, the armrest between adjacent seats can not be raised to allow the passenger to lie down across the seats, or the adjacent seat is occupied by another passenger preventing the sleep-desiring passenger from lying across the two seats.

There exist cushions to fill the space in the legwell between the front of the passenger's seat and the back of the next seat forward. However, some of these cushions are rigid, providing an uncomfortable experience. Some also extend to cover the seat, making the entire assembly unnecessarily large, making transport of the cushions even more difficult considering the awkward contortions needed to transit an airport and board and exit a crowded plane, as well as getting into and out of the legwell space in a car or train. The existing inflatable cushions have a single bladder in the legwell area, reducing the ability to adjust the pressure at different locations in the cushion in the legwell, similarly to a bed with a stiffer bottom box spring and a softer top mattress.

Accordingly, a cushion for filling the space in the legwell between seats in adjacent rows is desired that is soft, does not cover the seat, and can be adjusted to different levels of softness and rigidity at different heights is desired.

SUMMARY OF THE INVENTION

An inflatable cushion is disclosed. The cushion can have a flexible wall that can define a first reservoir (e.g., a mattress reservoir) and a second reservoir (e.g., a base reservoir), a first closable valve, and a second closable valve. The flexible wall can have an external wall and a septum separating the first reservoir and the second reservoir.

The first closable valve can be in fluid communication with the first reservoir and the outside environment. The second reservoir can be in fluid isolation from the first reservoir. The second closable valve can be in fluid communication with the first reservoir and the outside environment.

When the first reservoir and the second reservoir are in inflated configurations the external surface of the wall adjacent to the first reservoir and opposite to the second reservoir can be flat. The external surface of the wall adjacent to the second reservoir and opposite to the first reservoir can be flat and parallel to the external surface of the wall adjacent to the first reservoir and opposite to the second reservoir. For example, the top of the mattress reservoir's top wall can be flat and parallel to the bottom of the base reservoir's bottom wall.

When the first reservoir and the second reservoir are in inflated configurations, the first reservoir can have a first reservoir central axis and the second reservoir can have a second reservoir central axis. The first reservoir central axis can be collinear with the second reservoir central axis when the reservoirs are in inflated configurations.

The first reservoir can be above the second reservoir when positioned for use. The second reservoir can be narrower and/or shorter than the first reservoir.

Either or both reservoirs can have cells in fluid communication with each other and the respective reservoir. The cells can be surrounded by internal tensile cell walls attached to the external wall and the septum. The cell walls can provide tension to the external wall when the respective reservoir is inflated to maintain a desired shape of the respective sub-cushion (e.g., a flat top or bottom). When the respective reservoirs are in inflated configurations, the cell walls can be in tension between the septum and the respective external wall.

The cushion can have a heater and/or a cooler.

The cushion can have a third reservoir (e.g., a pillow reservoir) extending from the first reservoir in a direction away from the second reservoir. The third reservoir can be in fluid isolation from or fluid communication with the first and/or second reservoirs.

A method of using a cushion in the legwell between a first seat and a second seat in a vehicle is disclosed. The cushion can have an inflatable mattress reservoir and an inflatable base reservoir. The method can include inflating the base reservoir to a first pressure, positioning the cushion between the first seat and the second seat after the base reservoir is inflated, and inflating the mattress reservoir to a second pressure. After inflating the mattress reservoir, the cushion may not extend onto the first seat.

The method can include applying pressure with the mattress reservoir in a first direction (e.g., rearward) to a seat pad of the first seat and in a second direction (e.g., forward) to a seat back of the second seat. The mattress reservoir can be held in tension between the seat pad of the first seat and the seat back or backrest of the second seat. The first direction can be the opposite of the second direction.

The cushion can be positioned before the mattress reservoir is inflated. The cushion can be positioned after the mattress reservoir is inflated.

The first seat can be directly behind the second seat.

The first pressure can be greater than, equal to or less than the second pressure.

Also disclosed is a method for using a cushion system for a vehicle passenger. The method can include positioning a first legwell cushion in a first legwell of a first seat and second legwell cushion in a second legwell of a second seat. The first legwell can be adjacent to the second legwell. The method can also include laying a first passenger across the first cushion and the second cushion.

The method can also include rotating armrests attached to the first and/or second seat out of the way, and laying a second passenger across the first and second seats.

BRIEF DESCRIPTION OF THE FIGURES

FIG. 2 is a variation of sectional view A-A of the cushion of FIG. 1a.

DETAILED DESCRIPTION

Figure 1A:
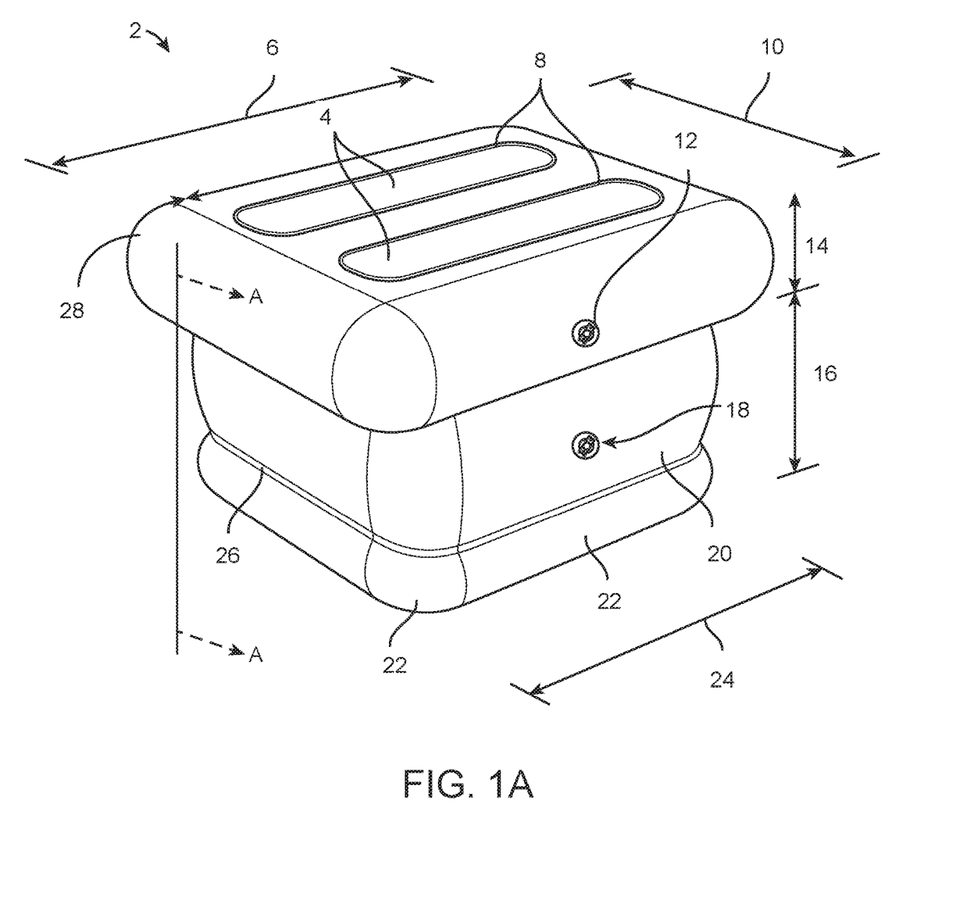
FIGS. 1a and 1b illustrate variations of the cushion.
Figure 1B:
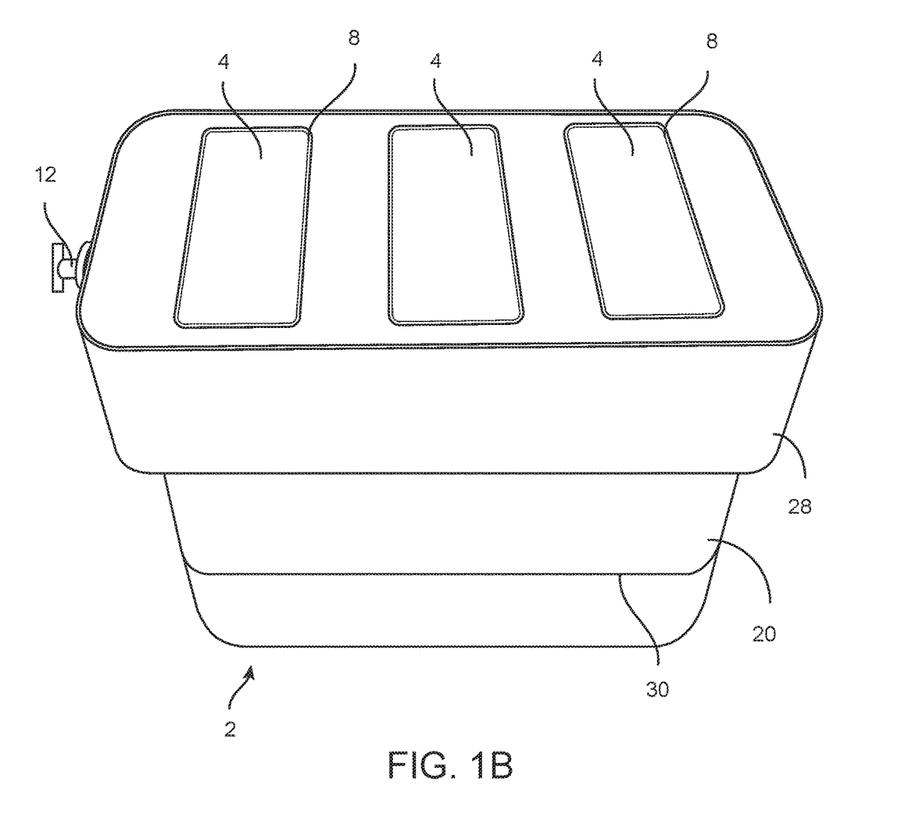

FIGS. 1a and 1b illustrate a cushion 2 or pillow that can be used in combination with a chair, sofa or seat 76. The cushion 2 can have a cushion wall that can be impermeable to air or other gasses or fluids, or combinations thereof. The cushion wall can be made from a flexible material, such as a fiber-reinforced plastic such as PVC vinyl polymer. The material can be bare and/or coated in all or part of the outside of the cushion 2 with a low-friction material such as felt, velvet, silk, satin, cotton, or combinations thereof.

The cushion 2 can have one or more sub-cushions, for example a mattress sub-cushion 28 and a base sub-cushion 20. The sub-cushions can be fluid-fillable and inflatable reservoirs or bladders. For example, the sub-cushions can be filled with air, carbon dioxide, water, saline solution, nitrogen, gel, or combinations thereof. One or both of the sub-cushions can be filled with one or more foams without or in combination with a fluid. The sub-cushions can be in fluid communication with each other or can be not in fluid communication with each other, for example having separate and distinct reservoirs. The mattress sub-cushions 28 can be at the top end of the cushion 2.

The sub-cushions can each have generally square or rectangular footprints with curved or rounded corners. When the sub-cushions are in an inflated configuration, the top surface of the mattress sub-cushion 28 can be substantially flat, and the bottom surface of the base sub-cushion 20 can be flat and parallel to the top of the mattress sub-cushion 28.

When in an inflated configuration and unbiased, the mattress sub-cushion 28 can have a mattress width 10, mattress length 6, and mattress height 14. The mattress width 10 at the wisest portion of the mattress sub-cushion 28 can be, for example, from about 30 cm to about 60 cm, more narrowly from about 45 cm to about 50 cm, for example about 47 cm. The mattress length 6 at the longest portion of the mattress sub-cushion 28 can be from about 20 cm to about 50 cm, more narrowly from about 35 cm to about 40 cm, for example about 38 cm. The mattress length 6 can be equal to the mattress width 10. The mattress height 14 can be from about 5 cm to about 30 cm, more narrowly from about 10 cm to about 20 cm, for example about 15 cm.

When in an inflated configuration and unbiased, the base sub-cushion 20 can have a base width, base length 24, and base height 16. The base width at the widest portion of the base sub-cushion 20 can be, for example, from about 10 cm to about 60 cm, more narrowly from about 25 cm to about 30 cm, for example about 28 cm. The base length 24 at the longest portion of the base sub-cushion 20 can be from about 10 cm to about 60 cm, more narrowly from about 25 cm to about 30 cm, for example about 28 cm. The base length 24 can be equal to the base width. The base height 16 can be from about 10 cm to about 50 cm, more narrowly from about 25 cm to about 30 cm, for example about 27 cm.

The base length and/or base width can be equal to, larger than or smaller than the mattress length 6 and/or mattress width 10, respectively.

The mattress sub-cushion 28 (as shown) and/or base sub-cushion 20 can have one or more tension cells. The tension cells can hold the top and/or bottom external wall 46 in a substantially flat configuration when the respective sub-cushion is inflated. The walls of the cells 4 can be attached to the external walls 46 of the respective sub-cushions at cell seams 8.

The base sub-cushion 20 can have a foot 22 at the bottom terminal end of the base sub-cushion 20 opposite the mattress sub-cushion 28. The base can narrow in width and/or length adjacent to the foot 22. The remainder of the base sub-cushion 20 can adjoin to the foot 22 at a foot juncture ridge 26 is narrower in length and width than the remainder of the base sub-cushion 20. The foot 22 can expand in width and/or length extending downward from the foot juncture ridge 26.

The mattress sub-cushion 28 can have a mattress valve 12 and the base sub-cushion 20 can have a base valve 18. The valves can be openable and closable and can be pulled away from and pushed into a recessed position in the respective sub-cushions, lying flat and flush against the sub-cushion external wall 46. When opened, the respective reservoirs can be in fluid communication with the outside environment through the respective valve. For example, a user can open the valve and pressurize or depressurize the respective reservoir (e.g., with a pump or by blowing through the valve) and then close the valve.

The external wall 46 on the top of the mattress sub-cushion 28 and/or on the bottom of the base reservoir 38 can have a foam, and/or liquid, and/or gel padding.

FIG. 1b illustrates that the base sub-cushion 20 can have a base mid-seam 30. The mid-seam 30 can circumscribe the base sub-cushion 20. The mid-seam 30 can extend outward from the remainder of the base sub-cushion 20 and can have a higher coefficient of friction than the surrounding base sub-cushion 20. For example, the mid-seam 30 can frictionally secure cargo stowed in the underseat storage volumes in front of the cushion 2, and/or frictionally secure the cushion 2 to the seat pad 66 or frame of the user's active seat 70.

One or both of the sub-cushions can have temperature control elements such as heaters and/or coolers. For example, the top wall of the mattress sub-cushion 28 can have one or more resistive heating coils and/or thermoelectric Peltier cooling strips (that can be used as heaters and/or coolers) embedded in the wall. The heating coils and/or Peltier coolers can be powered by replaceable and/or rechargeable batteries in a hard case on the side of the cushion 2 and/or by a detachable or fixed electrical cord extending from the wall of the cushion 2. The heaters and/or coolers can have a control for power, both to turn the power on and off and/or to adjust the amount of heat produced by the heaters and cooling produced by the coolers. The controls can include a thermostat to turn the heaters and/or coolers on and off or dynamically adjust the quantity of heat output or cooling output to maintain a constant temperature of the top surface of the cushion 2 as defined by a temperature control set by the user. The top surface of the cushion 2 can have a thermometer. The thermometer can sense the temperature of the top surface of the cushion 2 and can communicate the temperature of the top surface of the cushion 2 to the thermostat.

Figure 2:
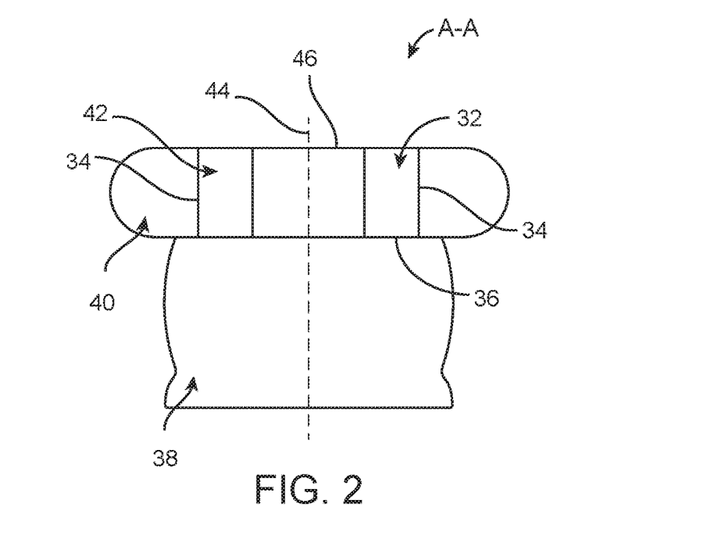

FIG. 2 illustrates that the cushion wall can have an external wall 46, a septum 36, and internal cell walls 34 defining, for example, a first cell 42 and a second cell 32.

When the cushion 2 is in an inflated configuration, the cell walls 34 can be in tension between the top external wall 46 of the mattress sub-cushion 28 and the septum. The cells 4 can be in fluid communication with the remainder of the mattress reservoir 40. For example, the cell walls 34 can have holes or can be otherwise fluid permeable. The cell walls 34 can be fluid impermeable and the cells 4 can be inflated to individual openable and closeable cell valves (not shown) through the external wall 46.

The external wall 46 and the septum 36 can define a mattress reservoir 40. The mattress reservoir 40 can be filled and pressurized or emptied and depressurized with a fluid through the mattress valve 12.

The external wall 46 and the septum 36 can define a base reservoir 38 on the opposite side of the septum 36 from the mattress reservoir 40. The base reservoir 38 can be filled and pressurized or emptied and depressurized with a fluid through the base valve 18.

The septum 36 can separate the base reservoir 38 from the mattress reservoir 40. The base reservoir 38 can be separate, distinct and not in fluid communication with the mattress reservoir 40. The septum 36 can be fluid impermeable. The mattress reservoir 40 can be filled with fluid to a mattress reservoir pressure. The base reservoir 38 can be filled with fluid to a base reservoir 38 pressure. The mattress reservoir pressure can be the same as, less than or more than the base reservoir 38 pressure.

The mattress reservoir 40 can be in fluid communication with the base reservoir 38. For example, the septum 36 can instead be fluid permeable, for example having holes.

When in an inflated configuration, the mattress reservoir 40 can have a vertical central axis 44 and the base reservoir 38 can have a vertical central axis 44. The vertical central axis 44 of the mattress reservoir 40 can be collinear with the vertical central axis 44 of the base reservoir 38.

Figure 3:
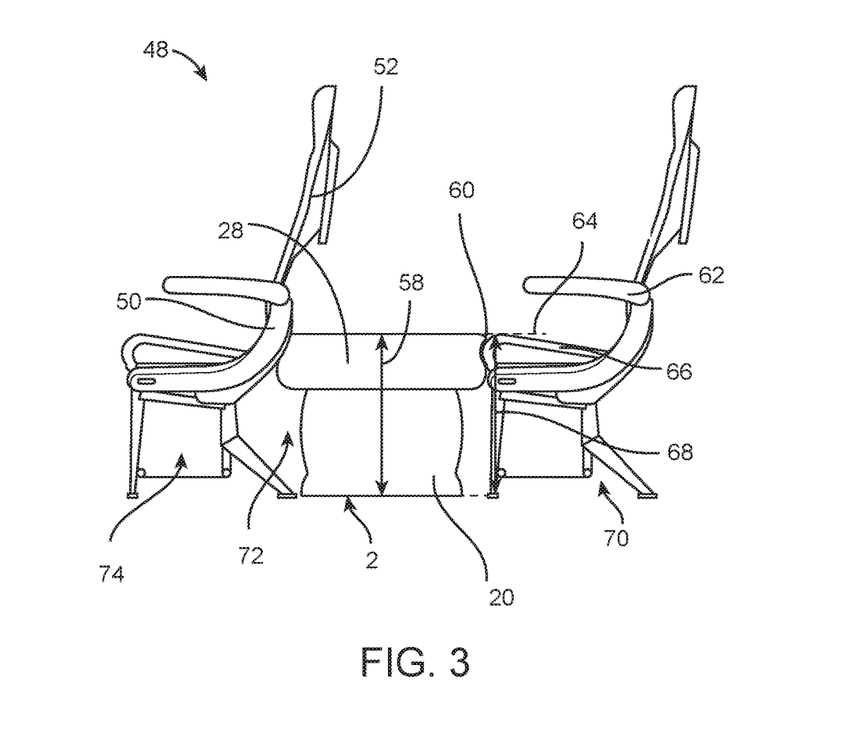
FIG. 3 illustrates a variation of a method for positioning the cushion between seats in adjacent rows.

FIG. 3 illustrates that the cushion 2 can be positioned in the legwell between an active seat 70 (i.e., the rear seat) and a direct adjacent, forward-adjacent seat 48 (i.e., the front seat 76 or bulkhead 80) to the active seat 70. The forward-adjacent seat 48 can be in a row of seats 76 in front of a row of seats 76 in which the active seat 70 resides. A passenger 82 using the cushion 2 can be assigned to or seated in the active seat 70 before the cushion 2 is inflated and positioned between the adjacent seats 76.

The seats 76 can have seat pads 66 that can be horizontal or at a small angle to the horizontal, backrests 52 and/or seatbacks that can be vertical or at a small angle to the vertical, armrests 62, or combinations thereof. The armrests 62 can separate the seating between directly adjacent side-by-side seats 76. The armrest 62 can be rotatable out of the way of the seating (i.e., rotated to a position where the length of the armrest 62 will be located between adjacent side-by-side seats' 76 backrests 52).

The space directly under the seats 76 and within the underside support frame of the seat can be the footwell or standard underseat storage volume 74. The standard underseat storage volume 74 can be accessible to the user seated in the seat 76 behind the respective standard underseat storage volume 74. When the cushion 2 is positioned and inflated as shown in FIG. 3, the front of the cushion 2 can segregate additional volume, an extended underseat storage, behind the standard underseat storage volume 74.

The seat pad 66 can have a seat pad maximum height plane 64 extending from the highest point on the seat pad 66. The seat pad maximum height plane 64 can extend at a seat pad maximum height 68 from the floor. When inflated, the cushion 2 can have a cushion height 58. The cushion height 58 can be less than or equal to the seat pad maximum height 68.

The base reservoir 38, e.g., and thus the base sub-cushion 20, can be inflated before, concurrent with, or after positioning the cushion 2 on the floor between the active seat 70 and the forward-adjacent seat 48. The mattress reservoir 40, e.g., and this the mattress sub-cushion 28, can be inflated before, concurrent with, or after positioning the cushion 2 on the floor between the active seat 70 and the forward-adjacent seat 48, and before, concurrent with, or after inflating the base reservoir 38.

When the mattress sub-cushion 28 is inflated and positioned between the active seat 70 and the forward-adjacent seat 48, the mattress sub-cushion 28 can be spaced from the active seat 70 and/or the forward adjacent seat 48, or can deform and be biased around the surface of the backrest 52 of the forward-adjacent seat 48 and/or around the front of the seat pad 66 of the active seat 70. The mattress sub-cushion 28 can be squeezed between and apply forward pressure to the rear of the backrest 52 of the forward-adjacent seat 48 and rearward pressure to the front of the seat pad 66 of the active seat 70, for example securing the mattress sub-cushion 28 between the rear of the forward-adjacent seat's 48 backrest 52 and the front of the active seat's 70 seat pad 66.

The highest point or highest line at which the mattress sub-cushion 28 contacts the seat pad 66 can be the seat contact high point 60 (which can also be the seat contact high line). The seat contact high point 60 can be lower than the highest cushion height 58 (as shown) or can be coplanar with the highest cushion height 58 (e.g., if there is no dip or divot at the location where the top of the cushion surface contacts the seat pad 66, forming a smooth transition from the seat pad 66 to the top of the cushion 2).

Figure 4:
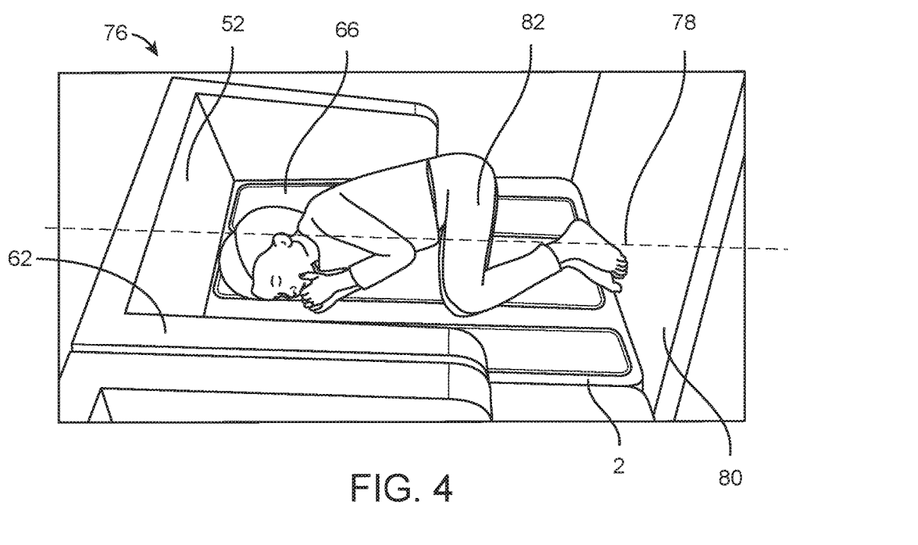
FIGS. 4 and 5 illustrate variations of methods for using the cushion.

FIG. 4 illustrates that the cushion 2 can be positioned and inflated in the legwell between the front of the seat pad 66 and behind the bulkhead 80 (or a forward-adjacent seat 48). The user, such as a vehicle passenger 82 assigned to the active seat 70, can lie along a longitudinal axis 78 of the seat 76 and/or vehicle on the seat pad 66 and the top of the cushion 2.

Figure 5:
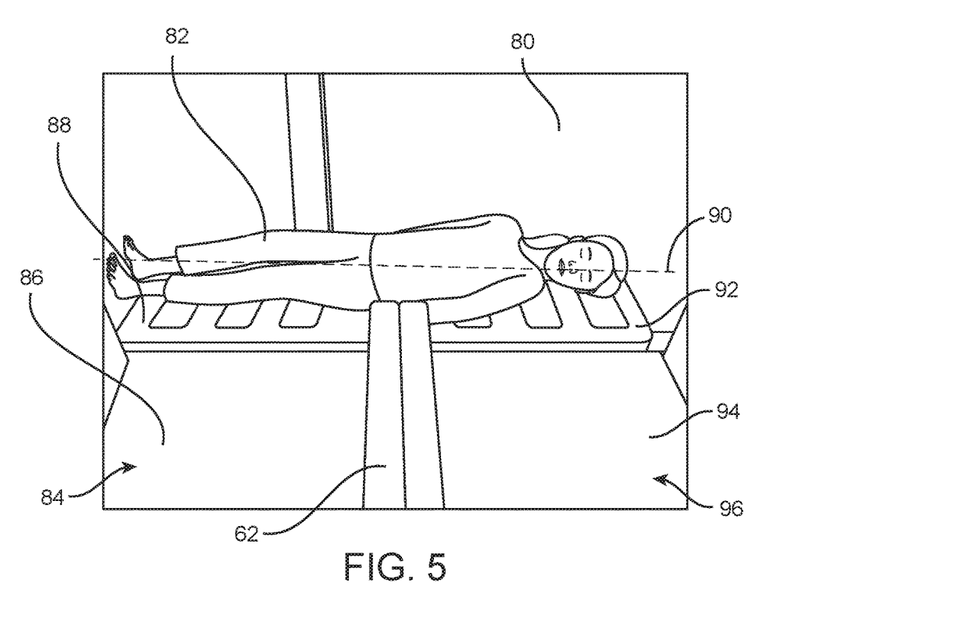

FIG. 5 illustrates that a first cushion 88 can be positioned and inflated in the legwell between the front of a first seat pad 86 of a first seat 84 and the bulkhead 80 (or a forward-adjacent seat 48). A second cushion 92 can be positioned and inflated in the legwell between the front of a second seat pad 94 of a second seat 96 and the bulkhead 80 (or a forward-adjacent seat 48). The first seat 84 and the second seat 96 can be directly adjacent side-by-side. The user can lie along a lateral or transverse axis 90 of the seats 76 along the first 88 and second 92 cushions.

The pressure in the mattress reservoir 40 can be increased and decreased to a satisfactory firmness for the user. The pressure in the mattress reservoir 40 can also be increased or decreased to fit the mattress sub-cushion 28 between the active seat 70 and forward-adjacent seat 48 (or bulkhead 80), for example with sufficient pressure to friction fit the mattress sub-cushion 28 between the active seat 70 and the forward adjacent seat 48.

The armrest(s) 62 can be rotated out of the way of the seat pads 66, for example positioning the length of the armrest 62 between the first seat's 84 backrest 52 and the second seat's 96 backrest 52. A first user can lie along the transverse axis 90 of the cushions 2 (as shown in FIG. 5), and a second user can concurrently lie along the transverse axis 90 of the first seat pad 86 and the second seat pad 94.

A pillow sub-cushion (not shown) can be attached to or integral with and extend upward from the top of the mattress sub-cushion 28 on one side of the central axis 44. The pillow sub-cushion can have a pillow reservoir in fluid communication with a pillow valve, similar to the valves described above. The pillow reservoir can be inflated and deflated separately from the mattress and base sub-cushions 20 to the same or a different pressure as the mattress reservoir 40. The pillow reservoir can be in fluid communication with or isolation from the mattress reservoir 40.

It is apparent to one skilled in the art that various changes and modifications can be made to this disclosure, and equivalents employed, without departing from the spirit and scope of the invention. Elements shown with any embodiment are exemplary for the specific embodiment and can be used in combination with or otherwise on other embodiments within this disclosure.

I claim:

1. An inflatable cushion comprising:
    a flexible wall defining a first reservoir and a second reservoir, wherein the flexible wall comprises an external wall and a septum separating the first reservoir and the second reservoir;
    a first closable valve in fluid communication with the first reservoir and the outside environment; and
    a second closable valve in fluid communication with the second reservoir and the outside environment,
    wherein the first reservoir is in fluid isolation from the second reservoir,
    wherein when the first reservoir and the second reservoir are in their inflated configurations, a first external surface of the wall adjacent to the first reservoir and opposite to the second reservoir is flat, and a second external surface of the wall adjacent to the second reservoir and opposite to the first reservoir is flat and parallel to the first external surface;
    wherein at least a portion of the first external surface extends continuously from a first lateral terminal end of the first reservoir to a second lateral terminal end of the first reservoir and continuously from a first longitudinal terminal end of the first reservoir to a second longitudinal terminal end of the first reservoir along the lateral extent of the first external surface of the flexible wall defining the first reservoir,
    wherein at least a portion of the second external surface extends continuously from a first lateral terminal end of the second reservoir to a second lateral terminal end of the second reservoir and continuously from a first longitudinal terminal end of the second reservoir to a second longitudinal terminal end of the second reservoir along the lateral extent of the second external surface of the flexible wall defining the second reservoir,
    wherein the first closable valve is on a first longitudinal side of the first reservoir,
    wherein the second closable valve is on a first longitudinal side of the second reservoir,
    wherein when the first reservoir and the second reservoir are in their inflated configurations, the first reservoir has a first reservoir central axis and the second reservoir has a second reservoir central axis, and wherein the first reservoir central axis is collinear with the second reservoir central axis,
    wherein the first reservoir is configured to be above the second reservoir when the second external surface is positioned against a floor,
    wherein when the first reservoir is in the inflated configuration, the first reservoir has a first reservoir length, a first reservoir width, and a first reservoir height,
    wherein when the second reservoir is in the inflated configuration, the second reservoir has a second reservoir length, a second reservoir width, and a second reservoir height,
    wherein the first reservoir length is greater than the second reservoir length,
    wherein the first reservoir width is greater than the second reservoir width,
    wherein the first reservoir height is less than the second reservoir height,
    wherein when the first reservoir and the second reservoir are in their inflated configurations, the inflatable cushion has a cushion height from 15 cm to 80 cm,
    wherein when the first reservoir and the second reservoir are in their inflated configurations, the first external surface is rectangular with rounded corners and the second external surface is rectangular with rounded corners,
    wherein the first reservoir has three cells defined by three corresponding internal walls, wherein the three internal walls are attached to the septum and to the external wall forming the first external surface, wherein the three internal walls are attached to the external wall forming the first external surface at three corresponding cell seams, wherein each cell seam is rectangular with rounded corners, wherein at least a portion of each cell seam extends from a first lateral side of the first reservoir to a second lateral side of the first reservoir and from the first longitudinal side of the first reservoir to a second longitudinal side of the first reservoir,
    wherein when the first reservoir is in an inflated configuration, the internal walls are in tension between the septum and the external wall forming the first external surface,
    wherein the flexible wall comprises polyvinyl chloride (PVC), and
    wherein a first external surface material is coated on at least a portion of the first external surface.

2. The cushion of claim 1, wherein the first external surface material is a low friction material.

3. The cushion of claim 1, wherein the first external surface material is felt, velvet, silk, satin, cotton, or combinations thereof.

4. The cushion of claim 1, wherein at least two of the cells are in fluid communication with one another.

5. The cushion of claim 1, wherein at least one of the internal walls is fluid permeable.

6. The cushion of claim 1, wherein the cushion height is from 35 cm to 50 cm.

7. The cushion of claim 1, further comprising at least one of a heater and a cooler.

8. The cushion of claim 1, further comprising a third reservoir extending from the first reservoir and in fluid isolation from the first and second reservoirs.

9. A method of using the inflatable cushion of claim 1 in a legwell between a first seat and a second seat in a vehicle, the method comprising:
    inflating the second reservoir to a first pressure;
    positioning the inflatable cushion between the first seat and the second seat after the second reservoir is inflated; and
    inflating the first reservoir to a second pressure;
    wherein after inflating the first reservoir, the cushion does not extend onto the first seat; and
    wherein the second reservoir is below the first reservoir after the inflatable cushion is positioned.

10. The method of claim 9, wherein the positioning of the cushion occurs before the mattress reservoir is inflated.

11. The method of claim 9, wherein the positioning of the cushion occurs after the mattress reservoir is inflated.

12. The method of claim 9, wherein at least a first portion of the inflatable cushion contacts a portion of the first seat and at least a second portion of the inflatable cushion contacts a portion of the second seat when the first reservoir and the second reservoir are in inflated configurations.

13. The method of claim 9, wherein the first pressure is greater than the second pressure.

14. The method of claim 9, wherein the first pressure is less than the second pressure.

15. The method of claim 9, further comprising rotating an armrest attached to the first and/or second seat, and laying a second passenger across the first and second seats.

16. An inflatable cushion comprising:
a flexible wall defining a first reservoir and a second reservoir, wherein the flexible wall comprises an external wall and a septum separating the first reservoir and the second reservoir;
a first closable valve in fluid communication with the first reservoir and the outside environment; and
a second closable valve in fluid communication with the second reservoir and the outside environment,
wherein the first reservoir is in fluid isolation from the second reservoir,
wherein when the first reservoir and the second reservoir are in their inflated configurations, a first external surface of the wall adjacent to the first reservoir and opposite to the second reservoir is flat, and a second external surface of the wall adjacent to the second reservoir and opposite to the first reservoir is flat and parallel to the first external surface;
wherein at least a portion of the first external surface extends continuously from a first lateral terminal end of the first reservoir to a second lateral terminal end of the first reservoir and continuously from a first longitudinal terminal end of the first reservoir to a second longitudinal terminal end of the first reservoir along the lateral extent of the first external surface of the flexible wall defining the first reservoir,
wherein at least a portion of the second external surface extends continuously from a first lateral terminal end of the second reservoir to a second lateral terminal end of the second reservoir and continuously from a first longitudinal terminal end of the second reservoir to a second longitudinal terminal end of the second reservoir along the lateral extent of the second external surface of the flexible wall defining the second reservoir,
wherein the first closable valve is on a first longitudinal side of the first reservoir,
wherein the second closable valve is on a first longitudinal side of the second reservoir,
wherein when the first reservoir and the second reservoir are in their inflated configurations, the first reservoir has a first reservoir central axis and the second reservoir has a second reservoir central axis, and wherein the first reservoir central axis is collinear with the second reservoir central axis,
wherein the first reservoir is configured to be above the second reservoir when the second external surface is positioned against a floor,
wherein when the first reservoir is in the inflated configuration, the first reservoir has a first reservoir length, a first reservoir width, and a first reservoir height,
wherein when the second reservoir is in the inflated configuration, the second reservoir has a second reservoir length, a second reservoir width, and a second reservoir height,
wherein the first reservoir length is greater than the second reservoir length,
wherein the first reservoir width is greater than the second reservoir width,
wherein the first reservoir height is less than the second reservoir height,
wherein when the first reservoir and the second reservoir are in their inflated configurations, the inflatable cushion has a cushion height from 15 cm to 80 cm, and
wherein when the first reservoir and the second reservoir are in their inflated configurations, the first external surface is rectangular with rounded corners and the second external surface is rectangular with rounded corners.

17. The cushion of claim 16, wherein the cushion height is from 35 cm to 50 cm.

18. The cushion of claim 16, further comprising at least one of a heater and a cooler.

19. The cushion of claim 16, further comprising a third reservoir extending from the first reservoir and in fluid isolation from the first and second reservoirs.

* * * * *